G. BRAMMAR.
POT AND PAN LIFTER.
APPLICATION FILED APR. 12, 1917.
1,253,928. Patented Jan. 15, 1918.
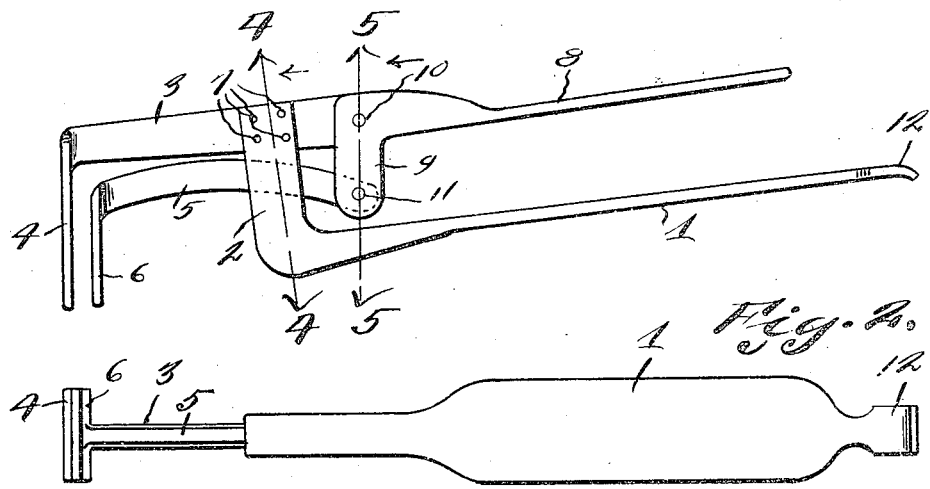
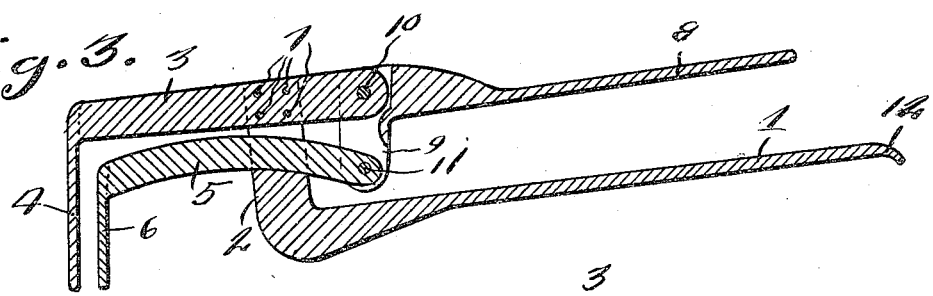
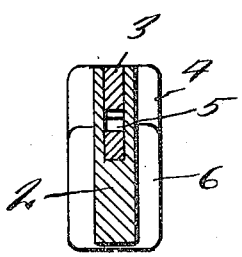
Witnesses
Philip Terrell
Francis G. Boswell
Inventor
G. Brammar
By D. Swift & Co.
Attorneys

UNITED STATES PATENT OFFICE.

GEORGE BRAMMAR, OF SUISUN CITY, CALIFORNIA.

POT AND PAN LIFTER.

1,253,928.  Specification of Letters Patent.  Patented Jan. 15, 1918.

Application filed April 12, 1917. Serial No. 161,487.

*To all whom it may concern:*

Be it known that I, GEORGE BRAMMAR, a citizen of the United States, residing at Suisun City, in the county of Solano, State of California, have invented a new and useful Pot and Pan Lifter; and I do hereby declare the following to be a full, clear, and exact description of the invention, such as will enable others skilled in the art to which it appertains to make and use the same.

The invention is an improved pot or pan lifter.

As one of its objects it seeks to provide a device by the use of which hot pots, pans or the like may be removed from the oven without danger of burning the hands.

A further object is to provide a device of this character which will be simple, strong and durable in construction, which can be cheaply made and which is so formed as to afford a firm grip, thereby making it serviceable to lift heavy pots or pans.

Other objects of the invention will appear in the detailed description which follows.

A particular structure is adhered to in illustrating this invention, to which structure, however, it is not to be restricted. The right is reserved to make such changes or alterations as practice may demand, provided these changes or alterations are comprehended in spirit by the appended claim.

Should the drawings and specification differ to the extent of having the one define some structure that is not set forth by the other, the right to such structure is claimed as though it had been fully treated by both.

The same numerals of reference designate the same parts in all of the several figures of the drawings, wherein:

Figure 1 is a side elevation of the invention.

Fig. 2 is a plan view, looking at the bottom of Fig. 1.

Fig. 3 is a central longitudinal section.

Fig. 4 is a section on the line 4—4 of Fig. 1.

Fig. 5 is a section on the line 5—5 of Fig. 1.

In the illustrated embodiment of the invention, 1 represents the lower handle blending into the upturned end 2 which is slotted to receive the arm 3 of the stationary jaw 4 and the arm 5 of the movable jaw 6. The jaw 4 is an integral part of the arm 3, this jaw being very wide with respect to the arm to provide a large contacting surface between it and the pot or pan to be lifted. The arm 3 is secured at the top of the upturned end 2 and in the slot formed in this end, rivets 7 effecting the connection.

The arm 3 extends beyond the point where it is connected with the upturned end 2 and has the movable handle 8 pivoted to it. This movable handle 8 has an angled end 9 which is slotted to permit the attachment of the handle to both the arms 3 and 5. Studs 10 and 11 connect the arms 3 and 5 with the handle 8, stud 10 so that the handle 8 may be pivotally movable with respect to the arm 3 and stud 11 so that the arm 5 may be pivotally movable with respect to the said handle.

The jaw 6 is an integral part of its arm 5, the jaw 6 being the same width as its coöperating jaw 4 and the arm 5 being slightly thinner than the arm 3 to permit it to move freely through the bottom portion of the slot formed in the upturned end 2. The arm 5 is curved, as shown, and the bottom of the slot wherein it moves is made to conform to this curve, so that the arm may rest wholly upon the bottom of the slot in all of its various positions. The object of making the arm 5 curved is for the purpose of keeping its jaw 6 always parallel with the jaw 4. This object is apparent when it is considered that the raising of the handle 8 to separate the jaws 4 and 6 raises the pivot 11 and with it the end of the arm 5. Were not the arm 5 curved, the raising of the pivot 11 would operate to shift the jaw 6 to an angular position with respect to jaw 4. But the curved formation of the arm 5 prevents this. As the handle 8 raises, the jaw 6 is made to recede from the jaw 4, but does not assume an angular position therewith for the reason that, as the arm 5 moves backward, its middle portion will pass into the slot at the time that the pivot 11 is passing a line perpendicular to the arm 3 and projected through the center of the pivot 10.

Up to this point the pivot 11 has been lowering and the jaw 6 has also been lowering (due to the curvature of the arm 5) but has been maintained parallel with the jaw 4. Further raising of the handle 8 then results in raising the pivot 11 and (because of the curved arm 5) the jaw 6 and maintains the latter in parallelism with the jaw 4.

The main portions of the handles 1 and 8 are wider than the angled ends 2 and 9 thereof, the handle 1 having a narrow portion 12 at its free end. When the device is not being used to lift pans or pots, it may be used as a means for raising the lids from the stove by inserting the narrow portion 12 in the recesses formed in the stove lids.

The lifting device shown and described is capable of exerting a very firm grip, thus enabling it to be used to lift heavy pots and pans.

A consideration of the description and drawings makes the operation of the device obvious and renders unnecessary any statements concerning such operation.

What is claimed is:

In a lifter for pots and pans, a handle member having at its forward portion an upturned part provided with spaced ears and an adjoining bifurcation between the ears, said bifurcation having its crotch partially curved, a member having means fixing it between the ends of the ears, said member having long and short arms, the long arm extending forwardly of the ears and terminating in a right angle downwardly extending jaw blade, a second member curved to correspond with and engage said curved crotch and disposed below the first member, said second member having short and long portions corresponding to and disposed adjacent the short and long arms of the first member, the long portion of the second member having a right angle downwardly extending jaw blade to coöperate with the first jaw blade, and a second handle member substantially parallel with the first handle member and having its forward portion provided with a right angle extending bifurcated lug adjacent to but reversely disposed with relation to the upturned part, and means pivoting the adjacent short arm and portion of said members in said bifurcated lug of the second handle member, whereby as the second handle member is moved toward and from the first handle member, the curved member is reciprocated adjacent the curved crotch.

In testimony whereof I have signed my name to this specification in the presence of two subscribing witnesses.

GEORGE BRAMMAR.

Witnesses:
EVERETT WILLIAMS,
ENSIGN H. KING.

Copies of this patent may be obtained for five cents each, by addressing the "Commissioner of Patents, Washington, D. C."